Aug. 13, 1957 R. COLOMBO 2,802,238
SCREW PRESS FOR WORKING PLASTICS
Filed Nov. 10, 1954 4 Sheets-Sheet 2

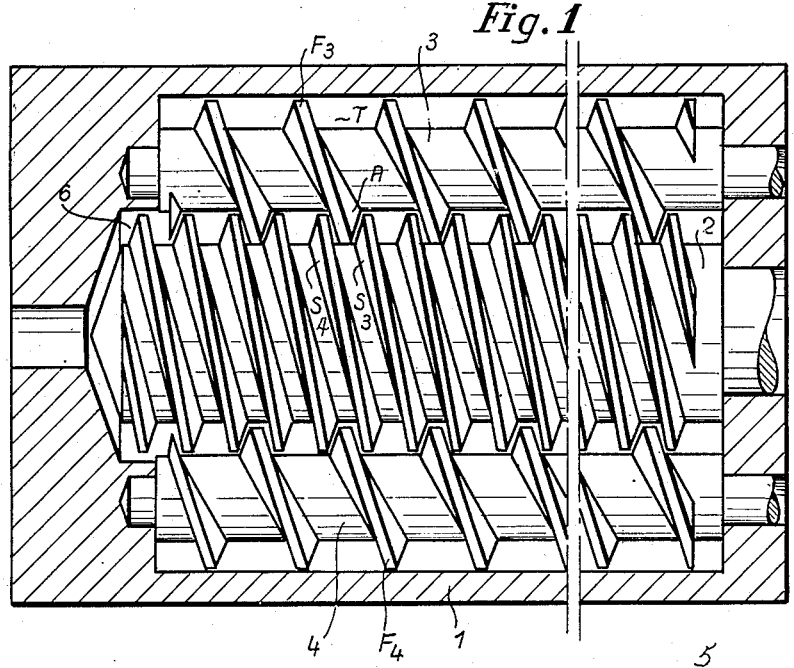
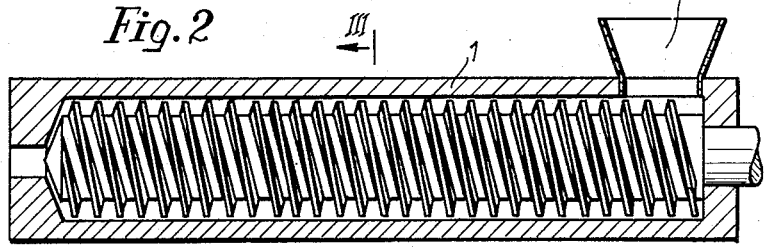
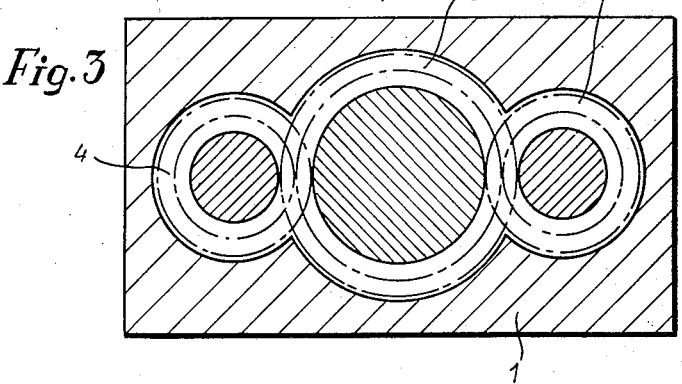

Aug. 13, 1957   R. COLOMBO   2,802,238
SCREW PRESS FOR WORKING PLASTICS
Filed Nov. 10, 1954   4 Sheets-Sheet 3

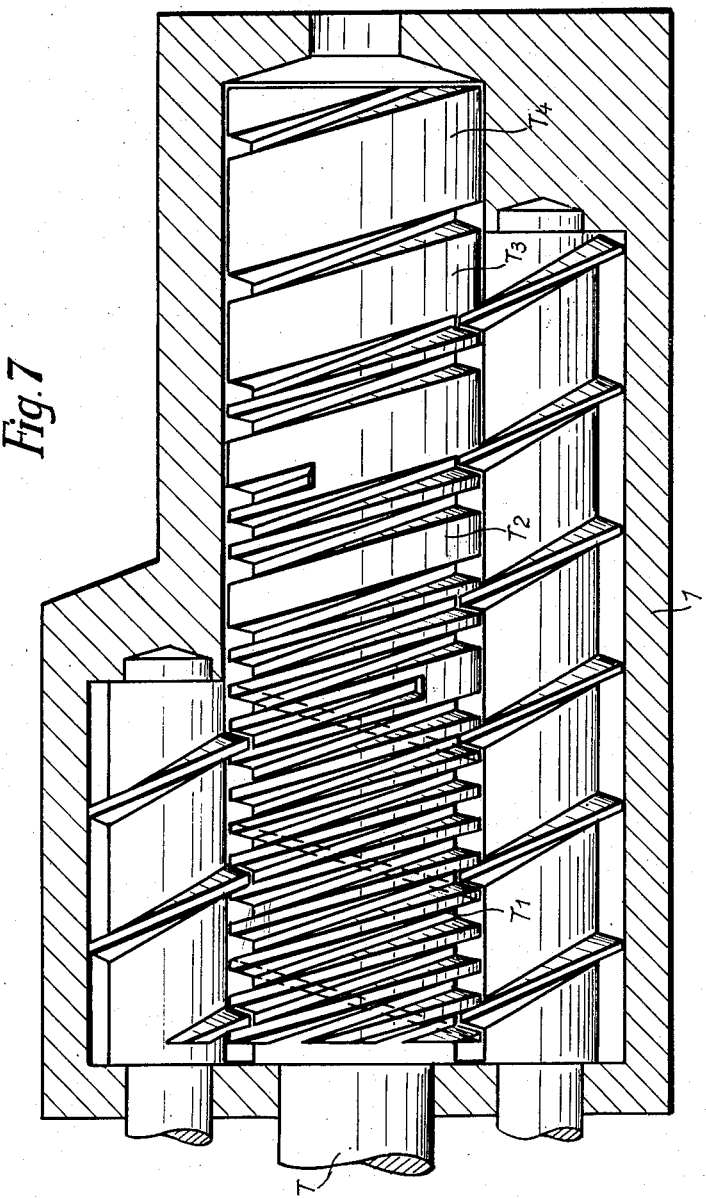

2,802,238

SCREW PRESS FOR WORKING PLASTICS

Roberto Colombo, Turin, Italy, assignor to S. A. S. Lavorazione Materie Plastiche (L. M. P.) di M. I. Colombo & C., Turin, Italy Application November 10, 1954, Serial No. 468,091

Claims priority, application Italy November 13, 1953

6 Claims. (Cl. 18—12)

This invention relates to a screw press, more particularly for working thermoplastic material.

Presses comprising a plurality of screws are currently employed in extruding thermoplastic material, each screw engaging with one or more adjacent screws.

Presses comprising a central screw engaging with peripheral screws are known, in which the axes of the latter screws are arranged along the edges of an equilateral prism having its axis coincident with the axis of the central screw.

Screw presses are further known, in which the axes of the screws are arranged along the edges of an equilateral prism without any central screw; and wherein each screw engages with two adjacent screws. The screws can be constant or variable in pitch, subdivided into section with or without the interposition of smooth intermediate portions, and adapted to rotate in the same or opposite directions.

By providing screw presses with more than two screws it was possible to increase the quantity of material worked by the press in a unit of time, for it has been ascertained that the quantity of material which can be processed by a screw press is by first approximation proportional to the number of screws in the press, assuming the screws to be equal in diameter. The increase in number of the screws is objectionable, more particularly in respect of the inherent increase in volume of the press. It is then more difficult to maintain the temperature uniform throughout the material treated, this being an essential requirement for satisfactory operation of a press for thermoplastic material.

In order to eliminate the above mentioned drawbacks the invention provides a screw press characterised by the fact that a multi-thread central screw engages with screws having a smaller number of threads than the central screw.

This invention is based upon the fact ascertained that the quantity of material than can be processed by a screw press depends not only upon the number of screws, but also upon the total number of lines along which the screws interengage, that is, upon the total number of the interengaging threads.

Screw presses having multiple-thread screws are known, in which each screw engages with a screw having the same number of threads.

Over known presses, in which a multiple-thread screw meshes with further screws equalling the former in number of threads, this invention affords the advantage of promoting mixing of the material, as will be understood from the appended description.

The drawing shows diagrammatically some embodiments of the invention.

Figure 1 is an axial sectional view of a three-screw press, in which a central two-thread screw engages with two one-thread lateral screws;

Figure 2 is an axial sectional view of the same press on a plane perpendicular to the section shown in Figure 1, extending through the axis of the central screw;

Figure 3 is a cross sectional view of the press shown in Figure 1;

Figure 7 is a longitudinal sectional view of a five-screw press with peripheral screws differing in length;

Figure 4:
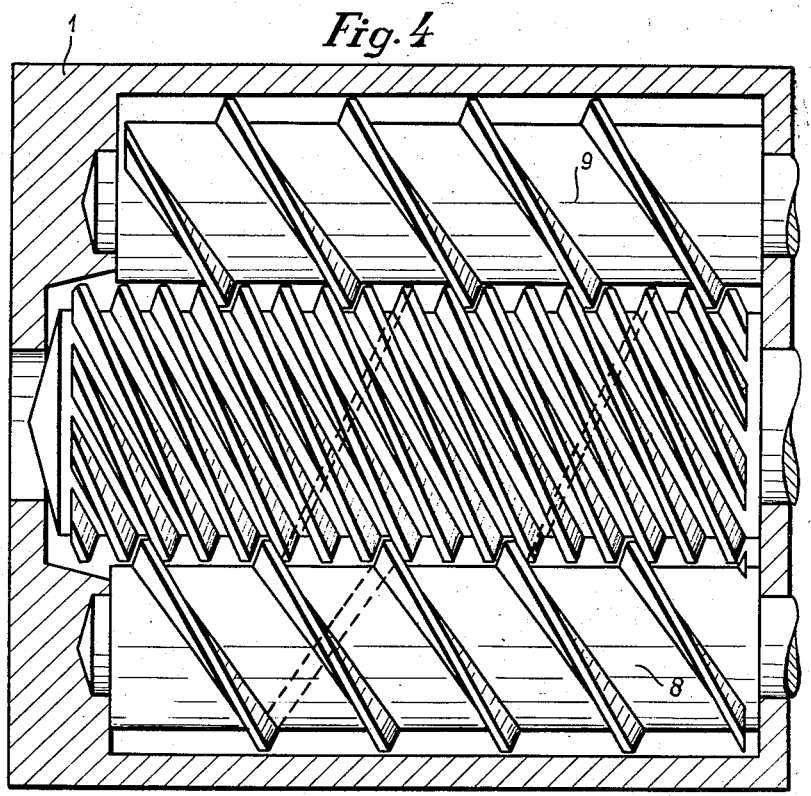
Figure 4 is a longitudinal sectional view of a four-screw press.

Referring to the drawings, Figures 1, 2 and 3, 1 denotes the casing enclosing the screws. The casing is kept at the desired temperature by a heating means, not shown, controlled by a suitable thermostat. Three screws 2, 3, 4 are arranged in the casing 1, said screws being of equal pitch and interengaging by means of their threads. The central screw 2 has two threads $S_3$ and $S_4$ engaging with the thread $F_3$ in screw 3 and thread $F_4$ in screw 4.

The raw material is supplied through the hopper 5, the material being fed through the press by the action of the two units comprising screw 3–screw 2 (thread $S_3$) and screw 4–screw 2 (thread $S_4$), respectively.

The screws 3 and 4 are equal, their diameter equalling or being smaller than the diameter of screw 2.

The central screw 2 is greater in length than the lateral screws 3, 4.

A mixing chamber 6 is provided at the end of the central screw, the material from the screw 4–screw 2 (thread $S_4$) uniting in this chamber with the material from the screw 3–screw 2 unit (thread $S_3$).

The above described press operates in the following manner.

The material supplied through the hopper 5 is fed forward, as the screws rotate, along the two threads $S_3$ and $S_4$ of the central screw. As the material on the thread $S_3$ comes into contact with the thread $F_3$ of the screw 3, for example along the line of contact A between the thread $S_3$ and thread $F_3$, the material cannot move further along the thread $S_3$ and is deflected into the clearance T between two contiguous threads of the screw 3. The material is fed from the clearance T by rotation of the screw 3 partly on the thread $S_3$, from which it had been removed, and partly on the thread $S_4$ which is opposite the clearance T.

This gradually effects intermixing of the materials fed along the various threads of the screw, besides the conventional mixing of the material fed along the screw.

The press construction shown in Figure 1 has been given by way of example only. Various other screw press constructions based on the same principle can be employed, among which reference will be made to the following ones:

(1) Central screw with $n$ threads and $n$ one-thread peripheral screws where "$n$" is any desired number (example: central screw with 5 threads and five one-thread peripheral screws, each thread in the latter meshing with a different thread in the central screw).

Figure 5:
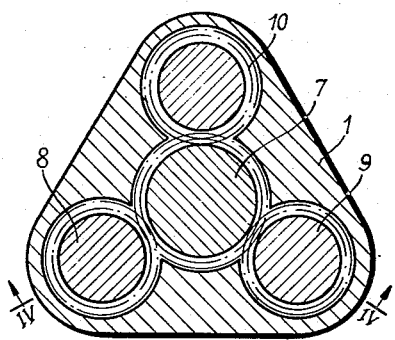
Figure 5 is a cross sectional view of the press shown in Figure 4.

(2) Central screw with $n$ threads and $m$ lateral screws with $p$ threads, so that $m.p=n$ example (Figures 4 and 5): central screw 7 with six threads, and three lateral screws 8, 9, 10 with two threads. The two threads of each lateral screw mesh with two distinct threads in the central screw.

Figure 6:
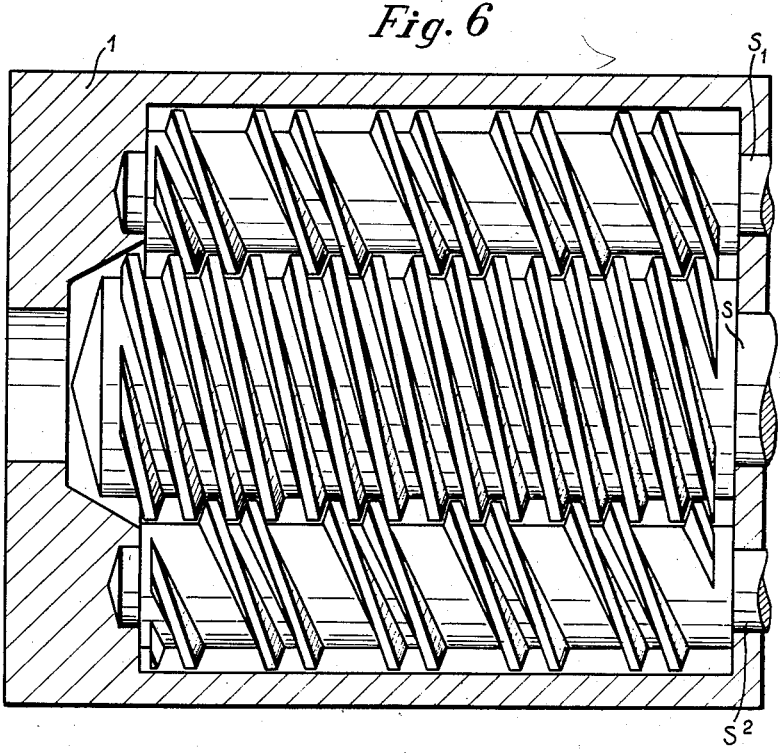
Figure 6 is a longitudinal sectional view of a five-screw press.

(3) Central screw with $n$ threads and $m$ multiple-thread lateral screws, each thread in the latter screws meshing with a thread in the central screw, such as:

*1st example.*—Central screw S with three threads 1-2-3 and three lateral screws $S_I$, $S_{II}$ and $S_{III}$ (not shown) with two threads (Figure 6). The two threads of the three lateral screws, respectively, mesh as follows:

$S_I$ 1-2
$S_{II}$ 2-3
$S_{III}$ 3-1

Each thread of the central screw therefore meshes with a thread in two lateral screws.

*2nd example.*—Central screw S with 4 threads 1-2-3-4 and four lateral screws $S_I$, $S_{II}$, $S_{III}$, $S_{IV}$ with three threads. The three threads of the four lateral screws engage, respectively, as follows:

$S_I$ 1-2-3
$S_{II}$ 2-3-4
$S_{III}$ 3-4-1
$S_{IV}$ 4-1-2

Each thread in the central screw consequently meshes with three threads in the lateral screws.

Combinations of type No. 3 just described afford a more thorough mixing than previous types.

Screws employed in screw presses of the type just described can be of a large variety of types. Some non-limiting examples follow:

(A) The peripheral screws rotate in the same sense as the central screw.

(B) The peripheral screws rotate oppositely to the central screw.

(C) The pitch of the central screw decreases from the inlet end to the extrusion end, the pitch of the lateral screws decreasing in accordance with the same law.

(D) The central screw is formed by successive portions decreasing in pitch, the number of threads being constant through the portions. The lateral screws are formed in the same manner by successive portions decreasing in pitch in accordance with the same law.

(E) The central screw is formed by successive portions decreasing in pitch. A smooth portion is interposed between portions differing in pitch, the number of threads being identical throughout the screw length. The one-thread or multiple-thread lateral screws are formed similarly to the central screw by alternating screw-threaded portions equalling in pitch the cooperating portions of the central screw with smooth portions.

Interposition of smooth portions along the screw length serves two chief purposes:

(1) Maintaining the material over a certain time within the press, which may be useful when the material should undergo transformations at given temperatures;

(2) Promoting intermixing of the material inasmuch as the material supplied from the various threads converges towards the smooth portions and is re-distributed along the various threads of the next screw portion.

Figure 8:
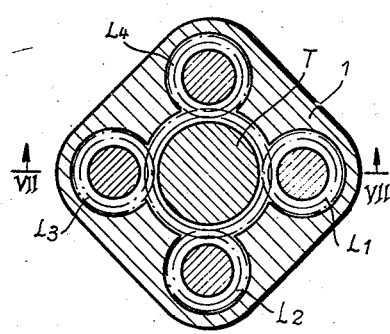
Figure 8 is a cross sectional view of the press shown in Figure 7.

(F) The central screw T is formed by constant pitch portions $T_1$, $T_2$, $T_3$, $T_4$ throughout its length (Figures 7 and 8). However, the number of threads differs among the various portions, said member decreasing from the inlet towards the extrusion end. The lateral screws $L_1$, $L_2$, $L_3$, $L_4$ are one-thread screws equalling in pitch the central screw and terminate various distances apart from the inlet end of the screw, more particularly at the end of the thread of the central screw with which the lateral screw meshes. This press construction, which is simple to operate, affords the desired compression of the material by successively reducing the number of threads or useful cross sectional area successively occupied by the material. In the example shown in Figures 7 and 8 the central screw T is subdivided into four sections $T_1$, $T_2$, $T_3$, $T_4$ and meshes with four lateral screws.

(G) The central screw is formed by portions constant in pitch throughout the screw length. The number of threads is variable over the successive portions, and decreases from the inlet to the extrusion end, a smooth portion being interposed between two successive screw portions. The lateral screws have one thread interrupted at the smooth portion of the central screw, said screws terminating various distances apart from the inlet end of the screw, more particularly at the end of the thread of the central screw with which the lateral screw meshes. This construction affords an improved mixing of the material as compared with the construction described under (F).

(H) This construction is similar to (G) but for the fact that the lateral screws are continuously screw threaded, including the portions corresponding to the smooth portions of the central screw. This construction affords over (G) an increased mixing effect of the material.

(I) The central screw is constant in pitch and thread number, the inclination of the thread sides varying from the inlet towards the extrusion end. This construction is described in Canadian patent application Ser. No. 604,715, filed August 18, 1950.

The lateral screws are likewise constant in pitch and thread number, the inclination of the sides of the threads varying in accordance with the same law as the variation in inclination of the sides of the threads in the central screw.

The variation in inclination of the sides of the threads affords a variation in compression of the material operated on by the press. It was ascertained that, other conditions being equal, increase in inclination of the sides of the thread increases the compression obtainable at the extrusion end, while reduction in inclination enhances mixing of the material.

(L) The central screw is constant in pitch and thread number throughout its length, but is subdivided into portions which differ in inclination of the sides of the thread. The inclination of the sides of the threads decreases from the inlet towards the extrusion end. The lateral screws are designed accordingly.

(M) The press screws are of the same construction as L; however, a smooth portion is interposed between two screw portions.

(N) The centrarl screw is constant in thread number from the inlet towards the extrusion end. The pitch of the central screws and inclination of the sides of the screw threads decrease from the inlet towards the extrusion end, the pitch and inclination of the sides of the threads in the lateral screws decreasing in accordance with the same law.

(O) The central screw consists of successive constant pitch portions, the inclination of the sides of the thread decreasing from the inlet towards the extrusion end. The lateral screws consist of successive constant pitch portions, the inclination of the sides of the threads decreasing in accordance with the same law.

(P) This combination is the same as (O), a smooth portion being interposed between two successive screw portions of the central screw and lateral screws.

(Q) The central screw consists of successive portions decreasing in pitch, the inclination of the sides of the thread decreasing from the inlet towards the extrusion end. The lateral screws are formed by successive portions decreasing in pitch, the inclination of the sides of thread decreasing in accordance with the same law.

(R) This is a combination similar to (Q), in which a smooth portion is interposed between two successive screw portions of the central screw and lateral screws.

In the above examples the screw diameters are assumed to be constant throughout the screw length, the outer screw periphery being in contact with the inner wall of the casing. However, the press can be designed with screws having parallel axes, gradually decreasing in diameter from the inlet end to the extrusion end. This construction is disclosed in U. S. Patent No. 2,563,396. The outer periphery of these screws still contacts with the inner surface of the casing which is, however, no longer formed by a set of parallel straight lines, two interengaging screws being caused to contact, so that the thread of the peripheral screw fully fills the clearance between two successive projections on the central screw, by gradually increasing the diameter of the inner core of the screws from the inlet towards the extrusion end.

The presses having a gradually decreasing outer diameter can be designed in accordance with any of the above described combinations by employing any of above mentioned screw types.

A feature common to all screw presses according to this invention resides in the fact that the length of the central screw exceeds the length of the lateral screws. The latter terminate ahead of the extrusion die, the material being conveyed towards the nozzle by the end portion of the central screw which consequently intermixes the material supplied by the various lateral screws. The end portion of the central screw is such as to improve mixing and compression of the material. With this object in view a screw portion decreasing in pitch and inclination of the sides of the thread can be employed. The end of the central screw can be integral with the remaining portion of said screw or separately attached thereto.

Figure 9:
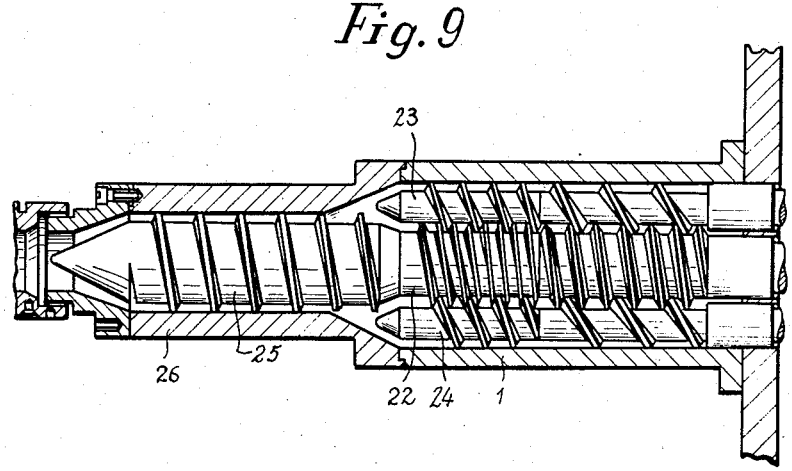
Figure 9 is an axial sectional view of a three-screw press, in which the central screw is considerably longer than the lateral screws.

In the construction shown in Figure 9 the central screw 22 is provided with an extension 25 rotatable in a forebody 26 with which the casing 1 of the press is provided. The extension substantially equals in length the lateral screws 23 and 24; however, under certain circumstances, the length of the extension may be increased up to twice the length of the lateral screws. The length can in any case be determined in accordance with the press delivery, for melting of the material should take place as the material is fed through the fore-body.

The extension may have one screw thread, as in the construction shown, in order to enhance mixing, or may have multiple threads. Moreover, any known means can be employed for increasing compression of the plastic material over this screw portion, such as a decreasing screw pitch, increase in thread length, increase in core diameter, these variations being either gradual or stepped.

The material is heated in known manner by heating the press casing and adjusting temperature thereof by means of thermostats provided for the purpose. Where necessary, the material can be heated by the central screw, which may be provided with an inner electric heating means or fluid circulation kept at the desired temperature. Heating of the material through the central screw, if desired through the peripheral screws too can be very important, more particularly in the case of large-size presses, in which it is essential to maintain a uniform temperature through the material.

What I claim is:

1. In a screw press, a central multiple-thread screw, a plurality of lateral screws having a smaller number of threads than the central screw and meshing with said central screw, and a casing enclosing the screws.

2. In a screw press, a central multiple-thread screw and a plurality of lateral screws having a smaller number of threads than the central screw and meshing with said central screw, a casing enclosing the screws, the central screw being greater in length than the lateral screws, and a mixing chamber within the casing for the material supplied by the lateral screws, the central screw portion extending beyond the end of the lateral screws being rotatable in said mixing chamber.

3. In a screw press, a central screw having $n$ threads, and $n$ lateral screws having one thread only engaging with said central screws, and a casing enclosing the screws.

4. In a screw press, a central multiple thread-screw, a plurality of lateral screws having a smaller number of threads than the central screw, all the threads in the central screw meshing with an equal number of threads in the lateral screws and a casing enclosing the screws.

5. In a screw press, a central multiple-thread screw and a plurality of lateral screws having a smaller number of thread than the central screw and meshing with said central screw, the central screw being greater in length than the lateral screws, the portion of the central screw extending beyond the end of the lateral screws equalling in length at least twice the lateral screws, and a mixing chamber for the material supplied by the lateral screws, the portion of the central screw extending beyond the end of the lateral screws being rotatable in said mixing chamber.

6. In a screw press, a central multiple-thread screw and a plurality of lateral screws having a smaller number of threads than the central screw and meshing with said central screw, the central screw being greater in length than the lateral screws, and a mixing chamber for the material supplied by the lateral screws, the central screw portion extending beyond the end of the lateral screws being rotatable in said mixing chamber, and the screw-thread of the portion of the central screw extending beyond the end of the lateral screws having one thread only.

References Cited in the file of this patent

UNITED STATES PATENTS

| | | |
|---|---|---|
| 1,990,555 | Loomis | Feb. 12, 1935 |
| 2,119,162 | Hartner | May 31, 1938 |
| 2,550,226 | Colombo | Apr. 24, 1951 |
| 2,563,396 | Colombo | Aug. 7, 1951 |
| 2,632,203 | Kruffe de Laubarede | Mar. 24, 1953 |
| 2,676,355 | Pasquetti | Apr. 27, 1954 |

FOREIGN PATENTS

| | | |
|---|---|---|
| 450,973 | Italy | Mar. 1, 1949 |
| 815,103 | Germany | July 8, 1949 |
| 1,030,069 | France | June 9, 1953 |